United States Patent
Luo et al.

(10) Patent No.: US 8,312,151 B2
(45) Date of Patent: Nov. 13, 2012

(54) COMMUNICATION SYSTEMS AND METHODS FOR DYNAMIC AND SECURE SIMPLIFICATION OF EQUIPMENT NETWORKING

(75) Inventors: Yujin Luo, Beijing (CN); Jingnan Huang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1036 days.

(21) Appl. No.: 12/083,853

(22) PCT Filed: Mar. 23, 2006

(86) PCT No.: PCT/CN2006/000476
§ 371 (c)(1),
(2), (4) Date: Jun. 27, 2009

(87) PCT Pub. No.: WO2007/045134
PCT Pub. Date: Apr. 26, 2007

(65) Prior Publication Data
US 2011/0106956 A1 May 5, 2011

(30) Foreign Application Priority Data
Oct. 21, 2005 (CN) .......................... 2005 1 0114270

(51) Int. Cl.
*G06F 15/16* (2006.01)
(52) U.S. Cl. ................... 709/228; 709/227; 370/395.65
(58) Field of Classification Search ................ 709/203, 709/204, 227, 228, 229; 370/395.65
See application file for complete search history.

(56) References Cited

U.S. PATENT DOCUMENTS

| | | | | |
|---|---|---|---|---|
| 6,766,143 | B1* | 7/2004 | Beckwith | 455/66.1 |
| 2004/0066757 | A1* | 4/2004 | Molteni et al. | 370/329 |
| 2006/0073850 | A1* | 4/2006 | Cha et al. | 455/562.1 |
| 2006/0098174 | A1* | 5/2006 | Ohuchi | 353/122 |
| 2006/0140135 | A1* | 6/2006 | Bonta et al. | 370/254 |

FOREIGN PATENT DOCUMENTS

| | | |
|---|---|---|
| CN | 1466327 | 1/2004 |
| CN | 1620070 | 5/2005 |
| EP | 1 370 050 A1 | 12/2003 |
| EP | 1 406 424 | 4/2004 |
| EP | 1 583 295 | 10/2005 |
| WO | WO 03/003610 A1 | 1/2003 |

OTHER PUBLICATIONS

Liang Zhu, "Radio Makes Networking Among Notebook PCs Easy", China Computer Education Journal, Feb. 28, 2005, 2 pages.
International Standard, Information technology—Telecommunications and information exchange between systems—Local and metropolitan area networks—Specific requirements—Part 11: Wireless LAN Medium Access Control (MAC) and Physical Layer (PHY) specifications, 1999, 17 pages.

* cited by examiner

*Primary Examiner* — David Lazaro
*Assistant Examiner* — Marie Georges Henry
(74) *Attorney, Agent, or Firm* — Patterson Thuente Christensen Pedersen, P.A.

(57) ABSTRACT

The present invention discloses a communication system and a method. The communication system includes at least first 802.11 equipment and second 802.11 equipment. The first 802.11 equipment including a network connector for searching relevant information of the second 802.11 equipment and modifying a network setting of the first 802.11 equipment according to the searched relevant information, and a 802.11 driver interface. The second 802.11 equipment includes a 802.11 driver interface. The driver interface of the first 802.11 equipment communicates with the driver interface of the second 802.11 equipment in accordance with the modified network setting.

11 Claims, 1 Drawing Sheet

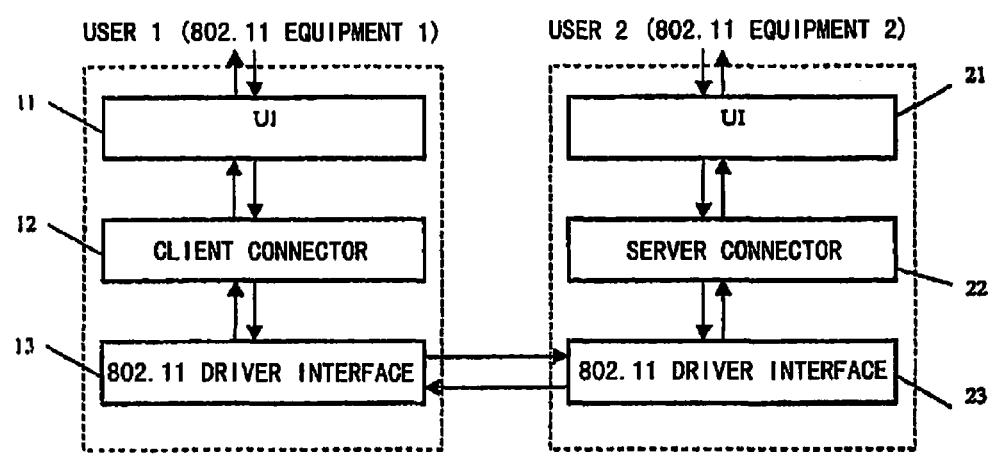

COMMUNICATION SYSTEMS AND METHODS FOR DYNAMIC AND SECURE SIMPLIFICATION OF EQUIPMENT NETWORKING

RELATED APPLICATIONS

This application claims priority to PCT Application No. PCT/CN2006/000476 filed Mar. 23, 2006, and Chinese Application No. 200510114270.6 filed Oct. 21, 2005, the disclosures of which are hereby incorporated by reference in their entireties.

FIELD OF INVENTION

The present invention relates to a communication system and a communication method, in particular to a communication system and a communication method, which comply with the 802.11 protocol.

BACKGROUND OF THE INVENTION

Independent Basic Service Set (IBSS) mode is defined in the 802.11 protocol. In that mode, it is possible to directly construct an ad-hoc network (self-organized network) among a plurality of wireless work station (STAs) without presence of an Access Point (AS). The network in this mode may be efficient for the applications requiring temporarily networking. For the current schemes, there is no fixed access point or server acting as an access control point for the network access, since there is no AP in the IBSS mode. Whether an STA may access an IBSS and communicate with the other STAs in that IBSS mainly depends on two factors, one is whether the respective STA has set the same Service Set Identifier (SSID), the other is whether the respective STA has set the same encryption way and key. Only if the same SSID, encryption scheme and key have been set, a plurality of STAs can form an IBSS network for communicating with one another. Among others, the SSIDs of all the IBSS networks within an area where one STA locates may be obtained by the conventional technical solutions. Particularly, an encryption scheme used by the respective STAs in a certain IBSS network, and whether to be encrypted can also be obtained by conventional technical solutions. For an IBSS network using encryption, its key cannot be obtained by searching. Therefore, it is impossible to join an IBSS network with encryption without its key. Such a technical solution is highly efficient for relatively fixed locations, such as an office, a house, a hotspot area and the like, which may efficiently ensure access security. However, the solution may cause inconvenience in applications in mobile scenarios having multiple dynamic interconnecting devices. The problems consist in that: in the multi-device dynamic interconnecting scenario, on one hand, it is excepted to mutually find the equipment around and the resources thereon among users, thereby using the resources upon networking, on the other hand, for relatively strange users, setting a common key enables respective users to access with one another, causing potential risks. Moreover, if the respective network access modes have been set as Open without a key, it may further cause users to worry.

On the other hand, in the dynamic interconnecting scenario, users generally need to use only a small part of the resources owned by the other user equipment, such as dynamic online games. Such resource usage seldom introduces security problems for providers. However, the existing 802.11 IBSS network networking mechanism has not provided a corresponding solution.

To solve the above problem, a solution has been proposed. In IGRS (Intelligent Grouping and Resource Sharing) Easy-Share software of Lenovo, the EasyShare provides a 802.11 wireless configuration scenario named "IGRS Mobile Network" as a default setting for the user. In that scenario configuration, the network type is IBSS, the network name is set by default, the encryption scheme is WEP, and the key is set by default. When a plurality of notebooks configured with that software switch its scenario to that scenario, a plurality of devices will constitute an IBSS network. These users may achieve file/data sharing by means of the IGRS EasyShare software. Upon achieving the file/data sharing by means of the IGRS EasyShare software, the resource provider may accept or reject a request from the resource requester according to a hint of the software.

The solution achieves rapid networking by setting the same 802.11 configuration, to thereby ensure security by means of the user confirmation during the data application. However, the solution has the following disadvantage: a) for the resource provider, it is necessary to switch to its own wireless network configuration in order to enable the resources requester to construct a network with itself, and if the resource provider has previously been connected to the other networks, such switching will cause disconnection of the previous connection; b) although the user hint and confirmation have been added, that mechanism is only applied for the applications achieved by the EasyShare. For other network-based application security, there will be risks that security may be reduced to a certain extent.

SUMMARY OF THE INVENTION

With respect to the above, one object of the present invention aims to provide a communication system and a method which may be able to simplify the networking among 802.11 equipment.

According to one embodiment of the present invention, the communication system comprises at least first 802.11 equipment and second 802.11 equipment, wherein the first 802.11 equipment includes a network connector for searching relevant information of the second 802.11 equipment and for modifying network settings of the first 802.11 equipment according to the searched relevant information; and a 802.11 driver interface; the second 802.11 equipment includes a 802.11 driver interface, wherein the 802.11 driver interface of the first 802.11 equipment communicates with the 802.11 driver interface of the second 802.11 equipment in accordance with the modified network setting.

One embodiment of a communication method according to the present invention comprises the following steps:

a) searching, by first 802.11 equipment, relevant information of second 802.11 equipment;

b) modifying, by the first 802.11 equipment, a network setting of the first 802.11 equipment according to the relevant information searched in step a);

c) communicating, by the first 802.11 equipment, with the second 802.11 equipment in accordance with the modified network setting.

According to the present invention, users may achieve networking of the devices upon searching, connecting, and using the other 802.11 equipment in the surrounding environment without any manual setting.

BRIEF DESCRIPTION OF THE DRAWINGS

FIG. 1 is a block diagram of a structure of a communication system according to the present invention.

DETAILED DESCRIPTION

FIG. 1, illustrates a block diagram for structure of a communication system according one embodiment to the present invention. The communication system complies with the 802.11 protocol. The communication system comprises 802.11 equipment 1 used by user 1 and 802.11 equipment 2 used by user 2. In this communication system, the 802.11 equipment 1 acts as a connection initiator, and the 802.11 equipment 2 acts as a connection object device. The 802.11 equipment 1 comprises a UI 11, a client connector 12, and a 802.11 driver interface 13. The 802.11 equipment 2 comprises a U121, a server connector 22, and an 802.11 driver interface 23.

User 1 firstly searches shared resources on the 802.11 equipment 2 by using the client connector 12 of the 802.11 equipment 1, and at the same time, obtains SSID, MAC address and the encryption state of the 802.11 equipment 2. If user 1 is interested in the shared resources X (not depicted) on the 802.11 equipment 2, the client connector 12 of the 802.11 equipment 1 will set the SSID of the 802.11 equipment 1 as the SSID of the 802.11 equipment 2, set its authentication mode as open, and sets WEP encryption as disable. If the client connector 12 cannot complete the operation, the users are prompted that it is impossible to access the target content through UI 11, because it is impossible to join the network of counter party. If the encryption state of the 802.11 equipment 2 is non-encrypted, it is not necessary to retransmit connecting commands.

At the same time, user 1 sends a command to the client connector 12 via the UI 11 of the 802.11 equipment 1, requiring initiation of a 802.11-based network connection request for the 802.11 equipment 2. The target resource is the content X on the 802.11 equipment 2.

The client connector 12 sends the connection request to the 802.11 driver interface of the 802.11 equipment 1. The connection request may be a unicast Probe Request frame extended with the connection request. The target address (DA) for the Probe Request frame is the MAC address of the 802.11 equipment 2. The frame adds an information element (IE) for indicating the connection request based on the Probe Request frame structure preset originally by the 802.11 protocol. The content of the information element includes at least two parts of the content as follows: name of the user initiating the connection request (that is, the name of user 1), the shared resource information (that is, the content x in this embodiment) destined for the present connection request, and the connection request time-out period.

The 802.11 driver interface 23 of the 802.11 equipment 2 receives the Probe Request frame, extracts the information element indicating the connection request therefrom, and sends it to the server connector 22 of the 802.11 equipment 2. The server connector 22 sends the name of user 1 and the target resource x to be accessed to the UI 21. Subsequently, the U I21 shows it to a user 2.

The user 2 determines whether the request of user 1 is approved according to the obtained information, and then makes a response that the connection is allowed or the connection is denied. If the server connector 22 receives a response that the connection is allowed or the connection is denied before the connection request time-out period expires, the server connector 22 drives the 802.11 driver interface 23 to send a unicast Probe Request frame extended with the connection request response, the target address (DA) of that frame is the MAC address of the 802.11 equipment 1. The frame is added with an information element (IE) for indicating the response result of the connection request based on the Probe Request frame structure preset originally by the 802.11 protocol. The content of the information element includes at least the following several parts of the content: the response result of the connection request (Success or Denied), and the valid time of the connection.

If the server connector 22 sends a response result indicating that it is a request success response, the server connector 22 adds the following information into an access control list of equipment of the 802.11 driver interface 23 of the 802.11 equipment 2: the MAC address of the connection initiating device (802.11 equipment 1) and the target resource information of the connection, the time-out period of the connection request, and the like.

If the client connector 12 has not received a Probe Response frame indicating response success before the time-out period of the connection request expires, the client connector 12 will hint to user 1 that the connection request has failed, through the UI 11. Otherwise, the user is hinted that the connection request has been successful. After the connection request has been successful, the user 1 may enable the resource of the target device used by the application software corresponding to the request target resource.

The 802.11 driver interface 23 of the 802.11 equipment 2 judges whether data frames from other 802.11 equipments are allowed according to the MAC addresses in the access control list of equipment. When a security mode of the 802.11 network of the equipment where the server connector is located is set as encrypted, if there are unencrypted data frames from equipment in the access control list of equipments, and the resource corresponding to the data frames is the resource for which the connection request of the equipment was previously conducted, the frames will be allowed. if there are unencrypted data frames from an equipment out of the access control list of equipments, the frames will be disabled, and if there are encrypted data frames from any equipment, the frames will be disabled only if the keys thereof are not correct. When the security mode of the 802.11 network of the equipments where the server connector is located is set as unencrypted, the data from the other equipments will not be judged.

The server connector 22 updates the access control list regularly, and then cleans those access-allowable equipments that are overdue.

In the following, the communication system and the operation of the method according to the present invention will be further illustrated by using an example.

A user A holds an MP3 player supporting the present invention with a network card complying with the 802.11 b/g/a specification in the airport. At this time, the wireless setting of the MP3 player of the user A is set as Ad-hoc mode, SSID is set as MusicPlayer, and WEP encryption is set as enabled. Thus, the user A may enable the function for searching network resource in the MP3 player, in order to find another MP3 player supporting the present invention carried by another user B within the airport. The wireless setting of the MP3 player of the user B is set as Ad-hoc mode, SSID is set as MusicSource, and WEP encryption is set as enabled, then the user B may set the "MP3 shared" state in his MP3 player. Consequently, the user A may enable the connection request to the MP3 player of the user B though his MP3 player, the MP3 player of the user B may hint to the user B that the user A is requesting a connection via a graphic shining and the like. If the user B approves the connection request, the software on the user A player firstly modifies the wireless configuration as SSIO: MusicSource, unencrypted, and hints to the user A that the connection has been successful. Subsequently, the user A may browse and download the shared music files on the MP3 player of the user B. However, when the user A attempts to access other resources on the user B, he will receive a hint that the access right is forbidden.

In this example, the MP3 player may share this resource via an ID of the MP3 shared service as an indication. In this way, only if the MP3 player of the user A sends a request for the MP3 shared service with the ID, the data packet may pass the examination of the software according to the present invention.

According to the present invention, it is possible to implement networking without any manual settings, when the user has searched, connected, and used the other 802.11 equipment in his surrounding environment.

The communication system and method according to the present invention are based on the 802.11 protocol standards, and may simply implement connections amongst the equipment in the 802.11 IBSS network on the basis of maintaining the compatibility of the original protocol.

The present invention introduces a method analogous to that employed when the pairing is conducted among Bluetooth equipment, such that the 802.11 equipment achieves the on-demand networking in the IBSS network in the dynamic interconnecting environment, and changes the distributed Ad-hoc networking mode into the connection request/response based networking mode.

Additionally, the present invention introduces the MAC layer filtering method, which ensures a certain security in the precondition that the complexity of the equipment connections has been simplified.

In the present invention, the method used by user 1 for searching resources may be implemented as follows:

1) The user 1 sends the description information of the resource to be searched to the client connector 12;

2) The client connector 12 extends the Probe Request supervisory frame of the MAC layer, and packages the description information of the resource to be searched in said Probe Request supervisory frame for broadcast;

3) The server connector 22 of the 802.11 equipment 2 that has received said Probe Request supervisory frame parses the description information of the resource in the extended Probe Request supervisory frame, and then transmits the description information of the resource to users or directly carries out the response processing according to a prior setting;

4) The response content is sent to the client connector 22 of the 802.11 equipment 2, and then the client connector 22 packages the response content in the extended Probe Response supervisory frame for transmission; and 5) The client connector 12 of the 802.11 equipment 1 that has received said Probe Response supervisory frame parses the content of the Probe Response supervisory frame, and then uploads the same to the user 1.

Of course, the above method is only an example. The present invention may adopt other methods to implement user 1's searching the relevant information of the 802.11 equipment 2.

The above embodiments are only intended to illustrate the technical solutions of the present invention, by no way of limitation Although the present invention has been described in great detail, it should be appreciated by those skilled in the art that the technical solutions of the present invention may be modified or equivalently substituted without departing from the spirit and scope of the present inventive technical solutions, all of which are covered in the scope of the claims according to the present invention.

What is claimed is:

1. A communication system, comprising:
at least a first 802.11 equipment and a second 802.11 equipment, wherein,
the first 802.11 equipment comprises a network connector for searching relevant information of the second 802.11 equipment and for modifying a network setting of the first 802.11 equipment according to the searched relevant information, and an 802.11 driver interface;
the second 802.11 equipment comprises an 802.11 driver interface;
the 802.11 driver interface of the first 802.11 equipment communicates with the 802.11 driver interface of the second 802.11 equipment in accordance with the modified network setting;
wherein the relevant information of the second 802.11 equipment comprises: an SSID, MAC address, encryption state and shared resource of the second 802.11 equipment, and
said network connector of the first 802.11 equipment sets the SSID of the first 802.11 equipment as the searched SSID of the second 802.11 equipment, sets an authentication mode as open, and sets WEP encryption as disable.

2. The communication system according to claim 1, wherein after said network connector of the first 802.11 equipment has modified the network setting, the 802.11 driver interface of the first 802.11 equipment sends a connection request to the 802.11 driver interface of the second 802.11 equipment for requesting to initiate a 802.11-based network connection with the second 802.11 equipment.

3. The communication system according to claim 2, wherein said connection request is a Probe Request frame added with an information element indicating the connection request, and a target address of the Probe Request frame is set as a MAC address of the second 802.11 equipment, and said information element indicating the connection request comprises: a name of a user using the first 802.11 equipment, shared resource information for the connection request, and a connection request time-out period.

4. The communication system according to claim 2, wherein the 802.11 driver interface of the second 802.11 equipment sends a connection response to the 802.11 driver interface of the first 802.11 equipment, in response to the connection request from the first 802.11 equipment.

5. The communication system according to claim 4, wherein said connection response includes a Probe Response frame added with an information element indicating a response result of the connection request, and said information element indicating the response result of the connection request includes: a response result of the connection request and a valid time of the connection.

6. The communication system according to claim 5, wherein if the connection response is a connection success response, the connector in the second 802.11 equipment adds information including the MAC address of the first 802.11 equipment, a target resource information of the connection, and the time-out period of the connection request into an access control list of equipment of the second 802.11 equipment, and the second 802.11 equipment controls communication with the first 802.11 equipment according to the access control list of equipment.

7. A communication method, comprising:
a) searching, by a first 802.11 equipment, relevant information of a second 802.11 equipment;

b) modifying, by the first 802.11 equipment, a network setting of the first 802.11 equipment according to relevant information searched in step a);

c) communicating, by the first 802.11 equipment, with the second 802.11 equipment in accordance with the modified network setting wherein the relevant information of the second 802.11 equipment searched in step a) includes: an SSID, MAC address, encryption state and a shared resource of the second 802.11 equipment, and in step b), the first 802.11 equipment, according to the relevant information searched in step a), sets the SSID of the first 802.11 equipment as the SSID of the second 802.11 equipment, sets an authentication mode as open, and sets WEP encryption as disable.

8. The communication method according to claim 7, wherein the step c) comprises the steps of:

1) the first 802.11 equipment sending a connection request to the second 802.11 equipment, requesting communication with the second 802.11 equipment;

2) the second 802.11 equipment sending a connection response to the first 802.11 equipment, in response to the connection request;

3) the first 802.11 equipment communicating with the second 802.11 equipment according to the connection response in step 2).

9. The communication method according to claim 8, wherein said connection request is a Probe Request frame added with an information element indicating the connection request, and a target address of the Probe Request frame is set as a MAC address of the second 802.11 equipment, and said information element indicating the connection request includes: a name of a user using the first 802.11 equipment, shared resource information for the connection request, and a connection request time-out period.

10. The communication method according to claim 8, wherein said connection request includes a Probe Response frame added with an information element indicating a response result of the connection request, and said information element indicating the response result of the connection request includes: the response result of the connection request and valid time of the connection.

11. The communication method according to claim 8, wherein if the connection response is a connection success response, a connector in the second 802.11 equipment adds information including the MAC address of the first 802.11 equipment, a target resource information of the connection, and the time-out period of the connection request into an access control list of equipments of the second 802.11 equipment, the second 802.11 equipment controls communication with the first 802.11 equipment according to the access control list of equipments.

* * * * *